United States Patent
Virág et al.

(10) Patent No.: US 7,663,078 B2
(45) Date of Patent: Feb. 16, 2010

(54) FOCUSING METHOD FOR THE HIGH-SPEED DIGITALISATION OF MICROSCOPE SLIDES AND SLIDE DISPLACING DEVICE, FOCUSING OPTICS, AND OPTICAL RANGEFINDER

(75) Inventors: Tibor Virág, Budapest (HU); Attila László, Budapest (HU); Béla Molnár, Budapest (HU); Attila Tagscherer, Tiszabogdorogma (HU); Viktor Sebestyén Varga, Pécel (HU)

(73) Assignee: 3DHistech KFT., Budapest (HU)

( * ) Notice: Subject to any disclaimer, the term of this patent is extended or adjusted under 35 U.S.C. 154(b) by 0 days.

(21) Appl. No.: 11/661,677

(22) PCT Filed: Jan. 27, 2005

(86) PCT No.: PCT/IB2005/050351

§ 371 (c)(1),
(2), (4) Date: May 31, 2007

(87) PCT Pub. No.: WO2006/024967

PCT Pub. Date: Mar. 9, 2006

(65) Prior Publication Data

US 2008/0099661 A1 May 1, 2008

(30) Foreign Application Priority Data

Sep. 2, 2004 (HU) .................................. 0401802

(51) Int. Cl.
G02B 7/04 (2006.01)
G01N 21/86 (2006.01)
G01C 3/08 (2006.01)
G01B 9/00 (2006.01)

(52) U.S. Cl. .............................. 250/201.2; 250/559.06; 356/4.03; 356/125

(58) Field of Classification Search ... 250/201.1–201.9, 250/559.05–559.08, 559.19, 559.24; 356/4.03–4.05, 356/3.07, 3.09, 125
See application file for complete search history.

(56) References Cited

U.S. PATENT DOCUMENTS 5,288,987 A 2/1994 Vry et al.

(Continued)

FOREIGN PATENT DOCUMENTS

DE 102 44 767 4/2004

(Continued)

*Primary Examiner*—Georgia Y Epps
*Assistant Examiner*—Don Williams
(74) *Attorney, Agent, or Firm*—Young & Thompson (57) ABSTRACT

A focusing method is provided for the high speed digitalization of microscope slides using an imaging device, wherein the slide is divided into fields of view according to the imaging device and focusing is performed. During rough focusing, several images are captured within the focus range using large focus steps. On the basis of this set of images the position of the best contrast is determined. Fine focusing is performed by adjusting the focus according to the focus distance already determined for another field of view and by focusing with fine steps. A slide displacing device is provided, which enables the displacement of a slide parallel to the optical axis. The slide displacing device includes slide holding elements affixed to one side of a supporting member having two parallel sides, which are connected by stiffening elements defining at least two parallel planes.

30 Claims, 7 Drawing Sheets

U.S. PATENT DOCUMENTS

| | | | |
|---|---|---|---|
| 5,604,344 A * | 2/1997 | Finarov | 250/201.3 |
| 5,608,529 A * | 3/1997 | Hori | 356/609 |
| 6,137,627 A | 10/2000 | Engelhardt et al. | |
| 6,640,014 B1 | 10/2003 | Price et al. | |
| 7,238,953 B2 * | 7/2007 | Zandbergen | 250/440.11 |
| 2002/0044346 A1 | 4/2002 | Nguyen et al. | |
| 2002/0172964 A1 | 11/2002 | Ippolito et al. | |
| 2003/0033703 A1 | 2/2003 | Amatucci et al. | |
| 2003/0043457 A1 | 3/2003 | Weyh et al. | |
| 2003/0098921 A1 | 5/2003 | Endo | |
| 2003/0197112 A1 | 10/2003 | Atkinson et al. | |
| 2004/0129858 A1 | 7/2004 | Czarnetzki et al. | |

FOREIGN PATENT DOCUMENTS

EP    1 300 713    4/2003

* cited by examiner

FOCUSING METHOD FOR THE HIGH-SPEED DIGITALISATION OF MICROSCOPE SLIDES AND SLIDE DISPLACING DEVICE, FOCUSING OPTICS, AND OPTICAL RANGEFINDER

TECHNICAL FIELD

The present invention relates to a focusing method for the high-speed digitalisation of microscope slides using an imaging device.

The invention further relates to a slide displacing device for conducting the method according to the invention, which displacing device is constructed to enable the displacement of a slide parallel to the optical axis of an optical imaging device; has a slide holding means defining a slide support plane; and has a first displacing means for displacing said slide holding means.

The invention further relates to a focusing optics for the formation of a plurality of optical images in different image planes, and especially for conducting the method according to the invention. The optics comprises at least one camera having an image-capturing surface and an optical system spaced apart.

The invention further relates to an optical rangefinder for conducting the method of the invention and for determining a focus range for a sample placed at an unknown distance from an objective of a microscope system. The optical rangefinder comprises a light source, a light sensor, and a beam splitter arranged on the opposite side of the objective as the sample and angled relative to the optical axis of the objective. The beam splitter directs light beam coming from the light source onto the objective and a part of the light beam coming from the objective onto the light sensor.

BACKGROUND ART

The analysis of tissue sections is an important field of medical diagnostics. For conducting a tissue analysis the tissue sample taken from a patient is sliced up in very fine sections, which are then placed on glass plates and are stained with various dyes. Finally the slide bearing the resulting sample is analysed with a microscope.

The efficiency of the analyses can be substantially enhanced by first digitalizing the samples using an automated imaging device comprising a microscope and afterwards analysing the digital images by a suitable software for processing the image files. Such a system for the automated imaging of microscope slides is known, for example, from U.S. Pat. No. 6,049,421.

The high-speed digitalization requires rapid and efficient focusing.

There are two kinds of focusing methods commonly used. The first method consists of placing the slide on a motorized stage, which is moved in directions X, Y and Z. A disadvantage of this method is that since the stage is not being moved directly, the motor driving the stage in direction Z has to move the two others motors corresponding to the directions X, Y as well. Henceforth a much greater mass has to be set in motion and stopped again, which limits the highest possible acceleration and motor breaking, meaning that the stage is displaced more slowly. Another disadvantage is due to the fact that the mechanical errors are additive, therefore, very often, focusing has to be performed for the sake of compensating the mechanical errors and not because of changes within the sample. The repeated focusing slows down the digitalisation. This problem can be solved by a slide displacing device disclosed in U.S. Pat. No. 6,262,838, which only includes motors for moving the stage in direction X, Y while the displacement of the slide in direction Z is achieved by tilting the slide about a fixed point. The drawback of this arrangement is that the slide is not displaced in a direction parallel with the axis Z, therefore focusing has to be carried out more often and it is also more difficult to fit the resulting images next to each other.

The other known focusing method involves moving the objective by piezo-crystals. However, this solution is rather expensive and the piezo-mechanics is in close connection with the objective meaning that if more than one objectives need to be used a separate piezo-mechanics has to be provided for each of them.

US 2002/0090127 A1 discloses a pulsed light illumination system that optically stops motion on a motorized stage, while allowing continuous physical movement, which eliminates the problem of stopping and restarting the motion of the stage between capturing the image of two neighbouring fields of view. This however does not solve the problem of focusing during fast-digitalization.

DISCLOSURE OF INVENTION

Technical Problem

Focusing is a time consuming procedure both when moving the stage and when moving the objective since the motion of the stage relative to the objective has to be stopped each time when an image is to be captured at a certain focal plane. It is understood that the absolute position of the focal plane can only be changed by moving the objective. However, in the context of the present invention 'focal plane' refers to a plane relative to the plane of the slide (in accordance with the terminology of the art). Therefore changing/adjusting the focal plane or focus refers to changing the relative distance between the focal plane and the slide (usually by displacing the slide carrier stage or slide).

The problem of frequent focusing is usually overcome by finding the focus distance (meaning the appropriate slide-objective distance for obtaining a sharp image) for a plurality of fields of view of a camera scanning the sample, which values are interpolated for determining the focus distances at the rest of the sample. However, it can be difficult to find good referential points and even then the interpolated values might prove to be unsuitable leading to unfocused images.

A further difficulty lies in determining a practical focus range (i.e. a distance interval) along the optical axis (axis Z) within which the focus distance for a sample is to be sought. Differing even by 10 microns from the presumed plane of the sample can lead to a situation where no image is visible on the image-capturing surface of the camera. In such cases focusing on an unfocused image is not sufficient, first the image as such has to be found.

The typical size of biological tissue samples is in the range of $cm^2$, while the field of view of the camera is about a couple of $\mu m^2$. Due to the unavoidable mechanical errors, moving the sample by a distance corresponding to a couple of fields of view will probably cause a displacement of more than 10 microns in the direction Z even if originally the sample was parallel with the surface of the objective. This problem is multiplied when focusing on cytological samples where, instead of a continuous tissue, discrete cells are allocated in varying densities along the slide. When dealing with continuous tissues once the focusing has been performed at a certain point the focus for the neighbouring fields of view can be easily found by changing the focus distance by fine steps starting from the focal plane of the known field of view since it can be assumed that the optimal focal planes (providing sharp images) for near fields of view are close to each other. However, if the sample is composed of single cells scattered on the slide then there are usually no already focused near fields of view containing a sample portion, which would provide a starting point for fine focusing. The regions of a slide having a continuous tissue sample can be found before starting the high-resolution digitalization by using a low-resolution preview camera. This, however, is not applicable for discrete cytological samples since it is usually impossible to determine the fields of view containing the sample cells using a low-resolution preview camera. This means that not only the sample-objective distance is unknown but even the fact whether or not a sample portion would be present in a given field of view is not sure. Hence, a device would be appreciated for determining the possible focus range so as to reduce the number of unnecessary focusing steps.

Technical Solution

The object of the invention is to provide a faster focusing method for overcoming the above-described problems and devices for carrying out the method, that is, devices for minimizing the mass to be moved together with the slide, and devices for minimizing the number of necessary displacements, meaning the number of times that the moving mass has to be stopped and set in motion again.

These objects are achieved by the focusing method of the invention adapted for the high-speed digitalisation of microscope slides using an imaging device. The method consists of the following steps.

a focus range is determined;
the slide is divided into fields of view according to the imaging device;
focusing is performed on an unfocused field of view by applying rough focusing and/or fine focusing where:
rough focusing on said unfocused field of view comprises the steps of
  displacing the slide in a direction parallel with the optical axis using a slide displacing device;
  capturing several images of said field of view within the whole focus range using large focus steps;
  calculating the definition of each of said images;
  finding the image with the best definition and adjusting the focus to this image;
fine focusing on said unfocused field of view comprises the steps of
  adjusting the focus according to the focus distance already determined for another field of view, which is not further from said unfocused field of view than a pre-given distance;
  simultaneously capturing an image at the focused image plane determined for said other field of view and capturing further images at the two neighbouring image planes corresponding to the smallest focus steps applicable;
  calculating the definition of all of said images;
  finding the image with the best definition and adjusting the focus to this image; and
  capturing the image of said field of view.

Further objects of the invention are the following devices adapted for conducting the method according to the invention.

According to the invention a slide displacing device is provided, which enables the displacement of a slide parallel to the optical axis of an optical imaging device; has a slide holding means defining a slide support plane; and has a first displacing means for displacing said slide holding means. The slide holding means is affixed to one side of a supporting means having two parallel sides, which parallel sides are connected by stiffening elements defining at least two parallel planes and the stiffening elements are adjoined to said sides via resilient elements, preferably flat springs.

Another object of the invention is a focusing optics for the formation of a plurality of optical images in different image planes. The optics comprising at least one camera having an image-capturing surface and an optical system spaced apart. The optical system comprises:

at least one optical beam splitter arranged in the optical path between an object and said at least one camera; and
means for directing the split beams by the at least one beam splitter—along at least two optical paths having different optical lengths—onto distinct areas of said image-capturing surface of the at least one camera.

A further object of the invention is an optical rangefinder for determining a focus range for a sample placed at an unknown distance from an objective of a microscope system. The optical rangefinder comprises a light source, a light sensor, and a beam splitter arranged on the opposite side of the objective as the sample and angled relative to the optical axis of the objective. The beam splitter directs light beam coming from the light source onto the objective and at least a part of the light beam coming from the objective onto the light sensor. The light source emits light within a second wavelength interval distinct from a first wavelength interval used for the microscopic analyses, and the beam splitter is a filter, which is substantially transparent in the first wavelength interval.

Advantageous Effects

Thus the above-described method and devices allow fast digitalisation of microscope slides by minimizing the mass to be moved together with the slide and minimizing the number of necessary displacements, meaning the number of times that the moving mass has to be stopped and set in motion again.

DESCRIPTION OF DRAWINGS

Further details of the invention will be illustrated by means of figures and exemplary embodiments.

BEST MODE

Figure 1:
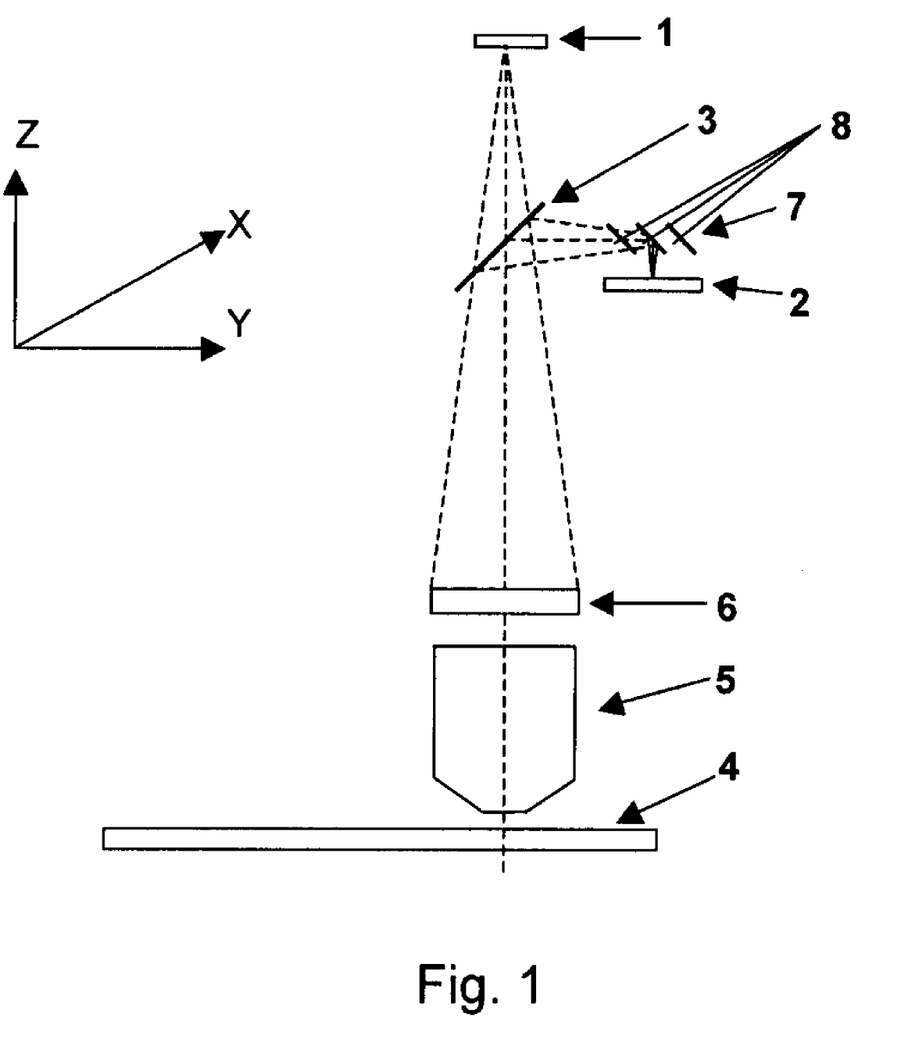
FIG. 1 is a schematic cross-sectional view of a focusing optics according to the invention.

FIG. 1 shows the schematic cross-sectional view of a preferred embodiment of a focusing optics designed for capturing a plurality of images lying in different image planes at the same time. The focusing optics comprises a main camera 1, a secondary camera 2, and a beam splitter, which is preferably a semi-reflecting mirror or semi-transparent filter 3. The filter 3 splits the light beam (shown with dashed line) coming from a slide 4 through an objective 5 and a tube lens 6 of an imaging device.

The commonly used objectives 5 are corrected for infinity, which has many advantages; however such objectives do not give a real image. The tube lens 6 is applied for forming a real image. It can be seen from FIG. 1 that the tube lens 6 projects an image directly on the image-capturing surface of the main camera 1. The semi-transparent filter 3 is arranged in this optical path at an angle of 45 degrees. The filter reflects half of the incident beam onto a row of optical filters 7 arranged at 45 degrees as shown. In this embodiment he row of filters 7 comprises filters 8 having a transmittance of 66%, 50% and 0%, meaning that the last filter 8 in the row 7 is a 100% reflecting mirror. The above transmittances assure that all beams reflected by filters 8 onto the image-capturing surface of the secondary camera 2 have substantially the same intensities. The distances are chosen in such a way that the optical path between the tube lens 6 and the secondary camera 2 of the light beam reflected by the middle filter 8 in the row of filters 7 has the same length as the optical path of the light beam incident on the main camera 1, which traverses the filter 3 between the tube lens 6 and the main camera 1. Consequently the same image plane is being projected onto the secondary camera 2 by the filter 8 as is captured by the main camera 1, while the other filters 8 placed ahead and after the middle one project image planes closer to the object and further away from it, accordingly. The filters 3 and 8 can be arranged at different angles then the given 45 degrees, provided that the optical paths preserve the above-described properties. The above-given transmittance values for filters 3 and 8 are not restrictive either however, it is important that the intensity of the light reaching the main camera 1 should be sufficient for capturing a clear image. It is furthermore advantageous if the intensity of the light beams reflected by the filters 8 onto the secondary camera 2 are substantially the same since this will allow for a more simple comparison of the image definition of the different image planes. Naturally more or less filters 8 could be aligned in the row of filters 7. Also, a separate secondary camera 2 could be provided for each of the filters 8.

Figure 2:
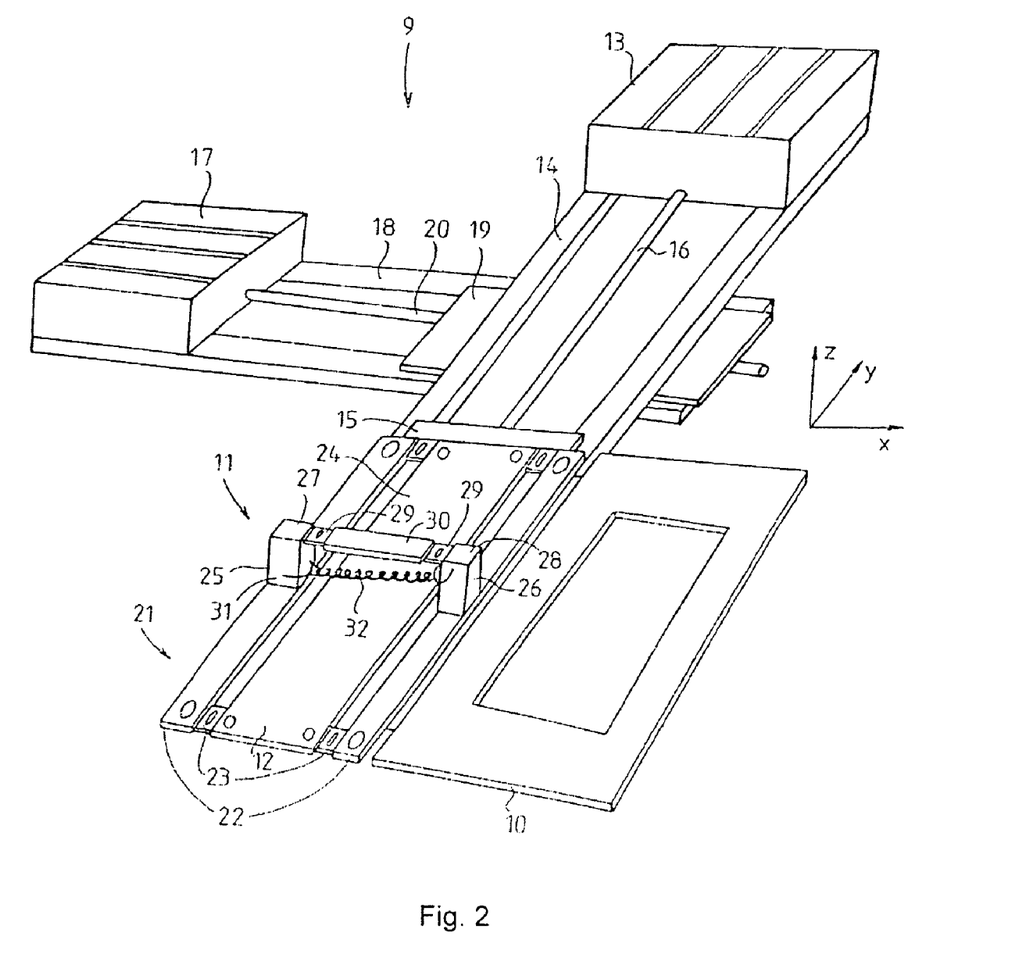
FIG. 2 is a top perspective view of a slide displacing device according to the invention.

FIG. 2 shows a schematic perspective view of a microscope slide displacing device 9 for conducting the method of the invention. Slide 4 is arranged on a slide holding frame 10, which is attached to a frame holder 12 having a resilient parallel linkage 11. The frame holder 12 is arranged on a carrier surface 15 of a rail 14 connected to a first stepping motor 13 capable of displacing the carrier surface 15 along the rail 14 lying in the axis Y by means of a threaded bar 16 driven by the stepping motor 13. Similarly, the rail 14 is arranged on a carrier surface 19 moving along a rail 18 lying in the axis X and the carrier surface 19 is displace by means of a threaded bar 20 driven by a second stepping motor 17.

The parallel linkage 11 is provided on the rectangle 21 forming the base of frame holder 12. Rigid flat bars 22 are provided at the longer sides of the rectangle 21, while the shorter sides and the centre area of the rectangle 21 is formed by a stiffening plate 24 attached to the flat bars 22 by means of flat springs 29. Two opposing columns 25, 26 are mounted on the centre portion of the two flat bars 22. The upper ends 27, 28 of the columns 25, 26 are connected by a narrow stiffening plate 30 having flat springs 29 at both ends. Furthermore, a pre-tensioning spring 32 is provided between the end 28 of one of the columns 26 and the foot 31 of the other column 25.

Figure 3:
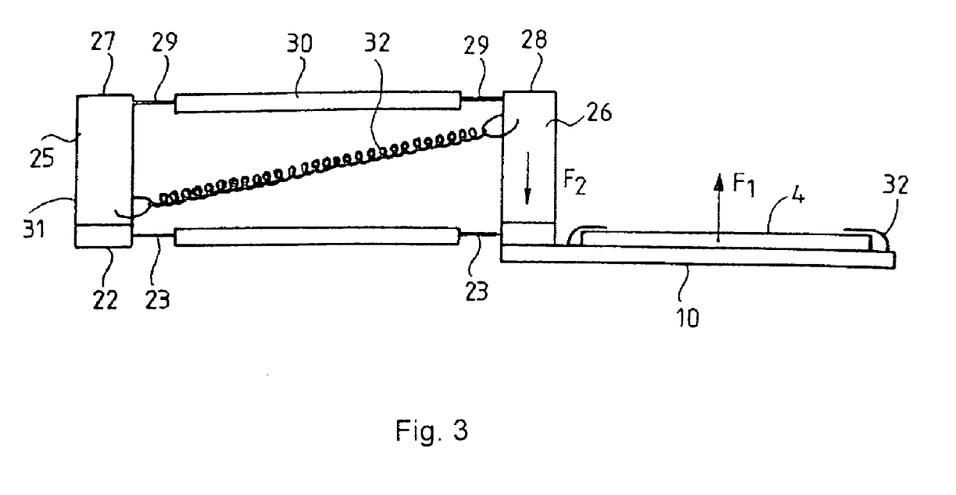
FIG. 3 is a schematic side view of the frame holder and the slide holding frame attached thereto.

A side view of the frame holder 12 having a parallel linkage 11 and the slide holding frame 10 adjoined thereto is shown in FIG. 3. As can be seen loops or lugs 33 are provided on the slide holding frame 10, these lugs 33 are designed to hold a slide 4 inserted between a surface of the frame 10 and the lugs 33. The slide is displaced along the axis Z by applying a force F1 perpendicular to the plane of the slide 4. The force F1 is transferred to the column 26 by means of the lugs 33 and the frame 10, whereby, due to the flat springs 29, the column 26 moves along the axis Z in a direction parallel to the other column 25. The function of flat springs, designed to replace joined connections, are well-know from the field of fine mechanics. Flat springs 29 have the advantage that the lost motions of joined connections can be eliminated. The parallel linkage 11 assures that the slide 4 is displaced parallel with itself and with the axis Z corresponding to the optical axis.

Figure 4:
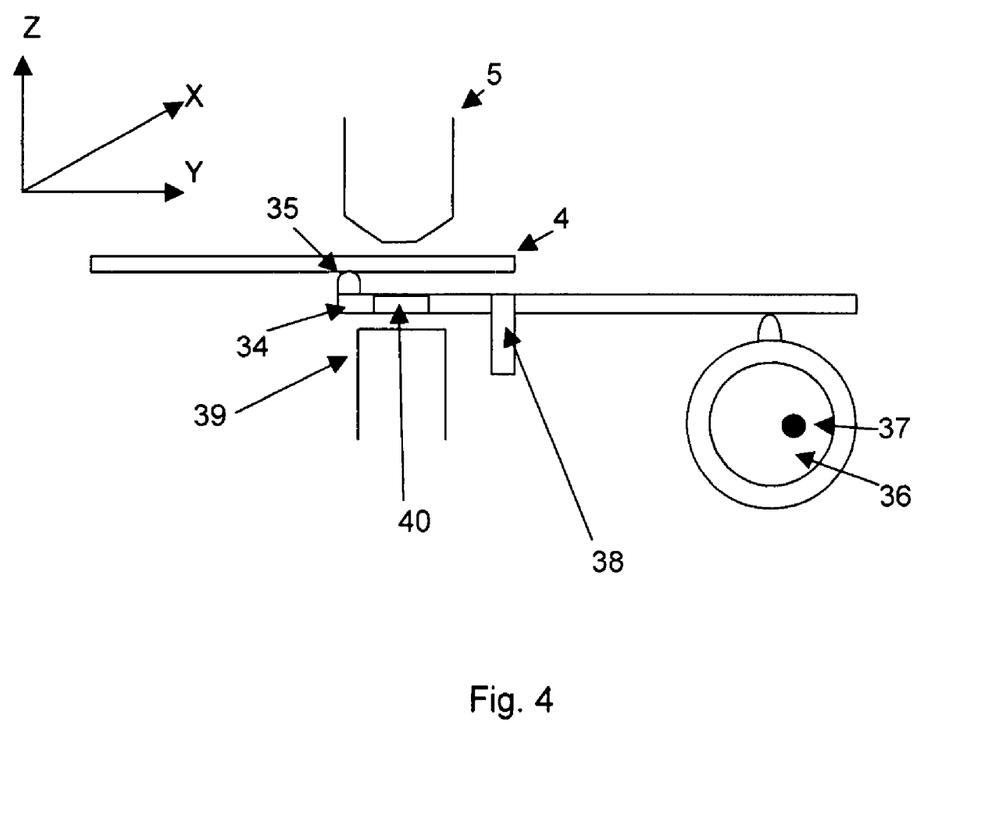
FIG. 4 is a schematic cross-sectional view of the focusing arm.

The pre-tensioning spring 32 acts with a force F2 on the column 26 forcing it downwards (only in the figures) against the mechanics responsible for the force F1 and displacing the slide along the axis Z, which mechanics is shown in further detail in FIG. 4. For the sake of visibility only the slide 4 is shown in FIG. 4, the frame 10 and the frame holder 11 are not represented. A projection 35 provided at one end of a focusing arm 34 abuts the slide 4. The other end of the arm 34 rests on an eccenter disk 36, which can rotate around an eccentric axis 37. The focusing arm 34 is furthermore supported by a support 38 and it is provided with an opening 40 around the optical axis defined by the objective 5 and the a condenser 39, which opening 40 is found between the projection 35 and the support 38.

The displacement of the slide 4 is carried out as follows. The eccenter disk 36 is turned about the axis 37 by a stepping motor, the end of the arm 34 at the eccenter disk 36 sinks or rises accordingly, whereby the arm 34 tilts about the support 38 letting the projection 35 at the other end rise or sink accordingly, consequently the slide abutting the projection 35 is displaced in the direction of the condenser 39 or that of the objective 5. The hemisphere-like projection 35 at the end of the focusing arm 34 presses directly against the slide 4 this way the mass to be displaced is only about a couple of grams and the resulting motion can be very fast. Also, the projection 35 is in the proximity of the optical axes eliminating the mechanical faults (resonance, resilient deformation, etc.), which would normally arise due to the distance of the optical axis and the displacing mechanics.

However, displacing the slide 4 parallel with itself does not reduce the focusing range. As mentioned before, a mechanical inaccuracy in the range of 10 micron can lead to such a displacement of the slide 4 relative to the perfect focal plane that no image will be distinguishable on the image-capturing surface of the main camera 1. When focusing on the slide 4 it would be advantageous to know the distance between the slide 4 and the objective 5.

Figure 5:
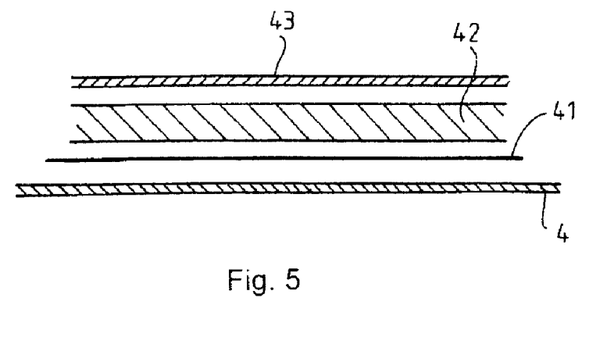
FIG. 5 is a schematic cross-sectional view of a sample on a slide.

FIG. 5 shows how a sample 41 is generally arranged on the slide 4 when used in the field of medical diagnostics. The slide 4 is a glass of about 1 mm thick and a sample 41 of about 5 micron thickness is arranged thereupon. The sample 41 is protected and preserved by a covering substance 42 of varying thickness and a glass cover 43 of about 0.17 mm thickness is placed on top of it all. One possible way of defining a focus range includes measuring the distance between the glass cover 43 and the objective 5. This measurement can be carried out by the optical rangefinder 44 illustrated in FIG. 6 to 8.

Figure 6:
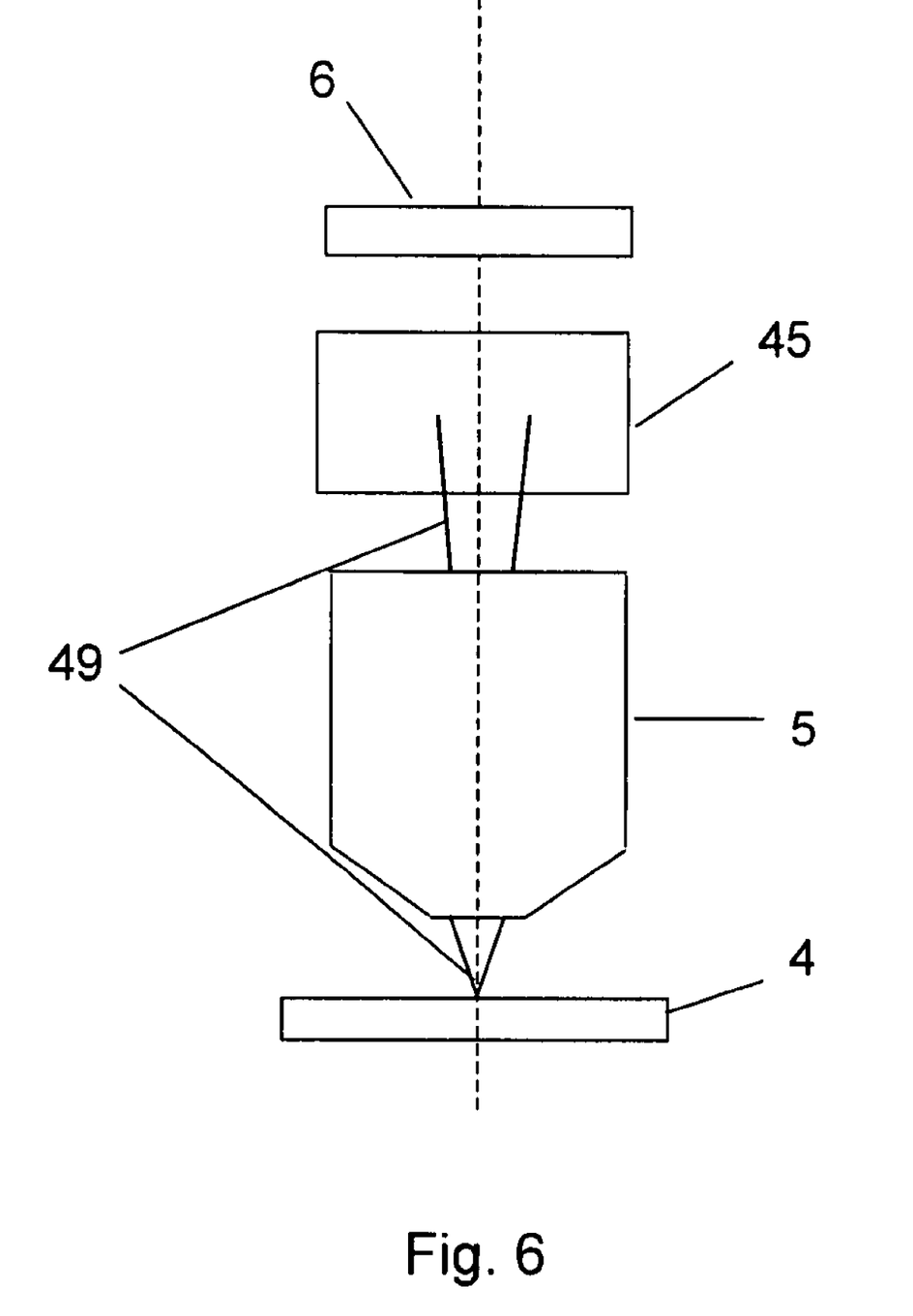
FIG. 6 is a schematic cross sectional view perpendicular to the axis X of an optical rangefinder according to the invention.
Figure 7:
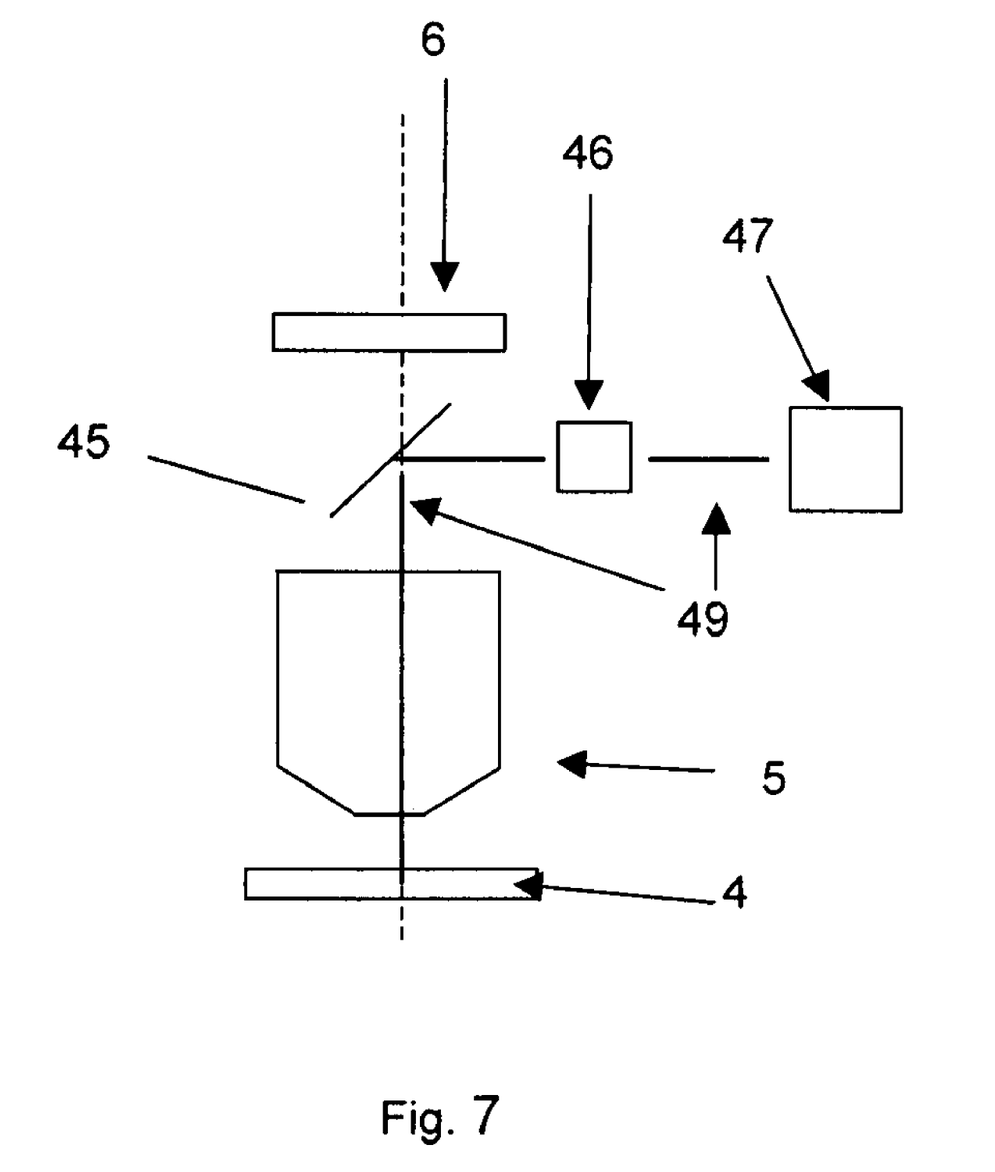
FIG. 7 is a schematic cross sectional view perpendicular to the axis Y of an optical rangefinder according to the invention.
Figure 8:
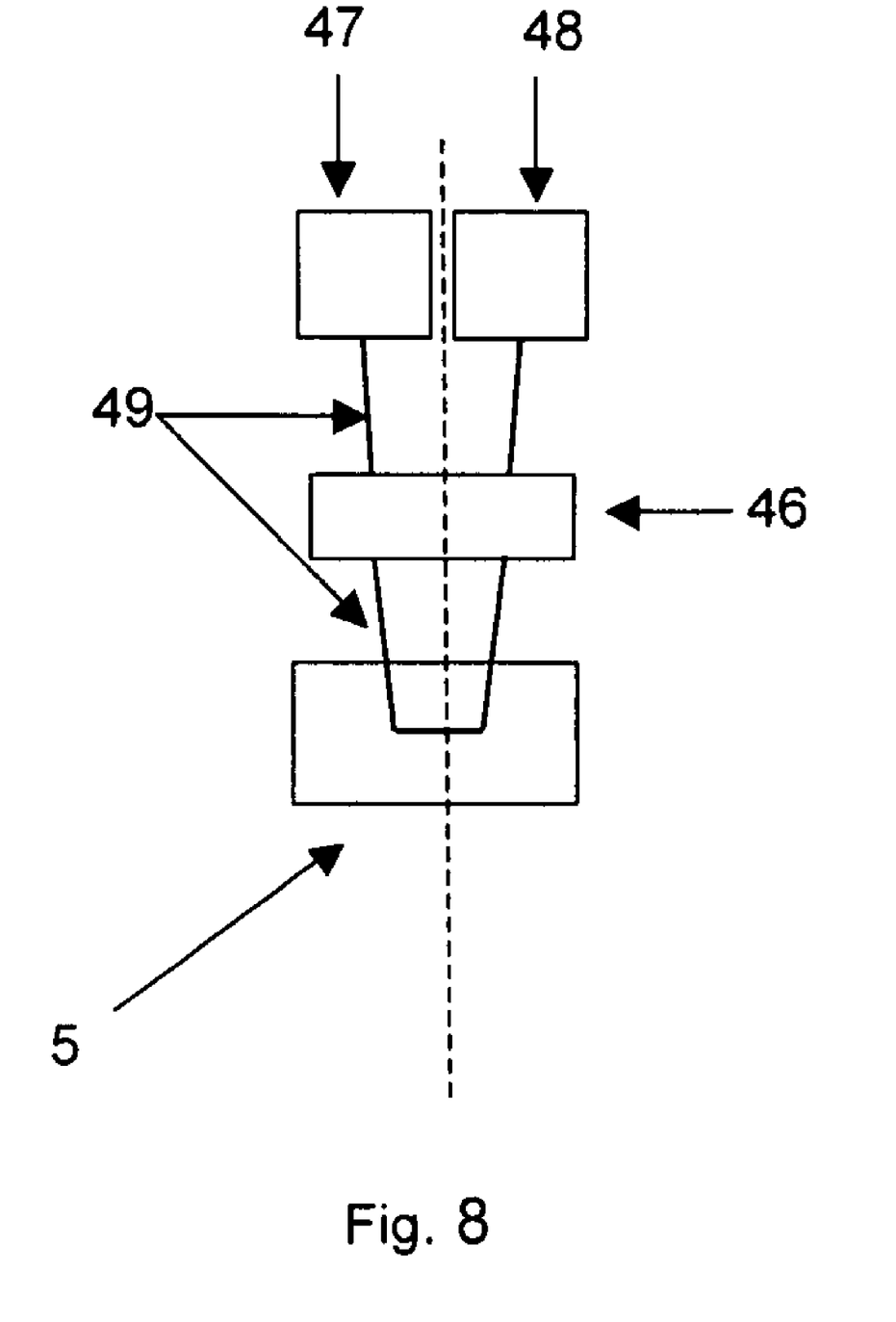
FIG. 8 is a schematic cross sectional view perpendicular to the axis Z of an optical rangefinder according to the invention.

FIG. 6-8 show a schematic cross sectional view perpendicular to the X, Y and Z axis of an optical rangefinder designed for performing the method of the invention. A filter 45 is arranged at an angle of 45 degrees relative to the optical axis (Z axis) defined by the objective 5 and the tube lens 6. Furthermore a prism 46, a source 47 (advantageously a laser source 47) and a camera 48 are also arranged level with the filter 45 as shown in FIGS. 7 and 8. The path of a laser beam 49 coming from the laser source 47 has been indicated in all three figures. The wavelength of the light emitted by the source 47 should be different from that used for the image digitalization, for which visible light is most commonly used in the field of medical diagnostics hence, for instance, infrared laser light might be suitable for an optical rangefinder 44 of such an imaging device. The filter 45 must have a special characteristic so as to reflect the laser beam 49 while being transparent regarding the wavelengths used for the analyses of the sample 41.

When using the rangefinder 44 the laser beam 49 emitted by the source 47 passes through the prism 46 after which it is reflected at an angle of 90 degrees from the filter 45 to enter the objective 5 and reach the glass cover 43 of the sample 41. Being reflected from there the beam 49 re-enters the objective 5 and is directed onto the camera 48 by the filter 45 and the prism 46. The camera 48 could be a row-sensor or a 2D-camera since the reflected laser beam 49 incident on the camera can only move along the horizontal direction (as seen on the figure and more precisely in the direction perpendicular to the optical axis). The image captured by the camera 48 can be evaluated by a computer or a microcontroller or similar, which might be incorporated in the optical rangefinder 44, or the evaluation can be done by the main computer controlling the microscope.

For describing the focusing method according to the invention first a few definitions are introduced.

Rough focusing comprises the following steps:
scanning within a maximum range (about 0.2 mm) using large focus steps;
an image of the sample 41 is captured at each step and the image definition is calculated;
the focus is adjusted so as to give the image with the best definition;
after this the best focus can be found using decreasing focus steps (successive approximation or binary search).

Rough focusing within a narrower range (or focus range) is the same as rough focusing but scanning is only performed within a narrower focus range. Such focus range can be determined by the optical rangefinder 44.

Fine focusing comprises the following steps:
simultaneously capturing an image lying in a given image plane and capturing further images lying in the neighbouring image planes determined by the smallest focus steps applicable;
calculating the definition of all of said images;
finding the image with the best definition and adjusting the focus to this image.

The focusing is based on image processing. Images in different image planes are captured for each field of view and the best focus distance is found by comparing the definition of the resulting images. The image definition is determined by analysing a given high frequency component. In practice this means that the deviation is calculated for each pixel and a pixel being at a given distance there from, which are then summarized. This sum is greater for a sharp picture than for an unfocused picture. The distance is chosen with regard to the optical resolution of the imaging system and is typically about a couple of pixels.

A preferred focusing method according to the invention is as follows.

It is assumed that neighbouring fields of view have nearly the same focal planes. Two distances are given, one for the fine focusing (for example 4 fields of view) and one for the rough focusing within a focus range (for example 8 fields of view). During the digitalisation, if within 4 fields of view of an unfocused field of view there is a focused field of view than the focus distance of that focused field of view is used and no further focusing is applied. If the closest already focused field of view is within a distance of 4 to 8 fields of view then this focus will be used as starting point for fine focusing, and the newly determined focus distance will be stored. If no focused fields of view are found within a distance of 8 fields of view than rough focusing is performed within the focus range.

The above-described focusing algorithm reduces substantially the number of times that the slide 4 has to be moved, which is particularly important during automated image digitalisation.

Using the above-illustrated devices for performing the focusing method of the invention has the following advantages.

The mass to be moved together with the slide 4 is minimized thanks to the slide displacing device 9 of the invention, which is designed to allow for the direct displacement of the slide 4 along the axis Z, hence it is not necessary to move the whole of the slide carrying stage and the X, Y stepping motors 13, 17 as well.

The present invention provides a focusing optics having beam splitters, for example filters 3, 8 of given transmittance, designed to capture more than one images in different image planes at the same time. Thereby the number of times the slide 4 has to be moved can be minimized.

Furthermore the optical rangefinder 44 according to the invention is designed to find an optimal focus range for the sample 41 being at an unknown distance from the objective 5. The defined focus range can be advantageously used as a narrowed range for rough focusing, which reduces the number of steps to be performed during rough focusing.

The above-described embodiments are intended only as illustrating examples and are not to be considered as limiting the invention. Various modifications will be apparent to a person skilled in the art without departing from the scope of protection determined by the attached claims.

The invention claimed is:

1. A focusing method for scanning a specimen on a microscope slide comprising the steps of:
a) dividing the slide into fields of view;
b) simultaneously capturing a plurality of images of a plurality of image planes of an imaged field of view with second image intensities via at least one secondary camera arranged at a plurality of secondary optical paths having different optical lengths connecting the at least one secondary camera with the imaged field of view and passing through a microscope optics, said at least one secondary camera having a plurality of image-capturing surfaces being formed as distinct portions of a single camera;
c) calculating a best focused image from said plurality of images captured of the plurality of image planes;
d) changing a first optical path connecting a high-resolution camera separated from said at least one secondary camera with said imaged field of view and passing through said microscope optics with an objective via a focus acquisition means for modifying the distance of the slide from the objective such that a resulting first image plane incident on said high-resolution camera is identical with the image plane of the best focused image; and e) capturing a high resolution image of said first image plane.

2. The focusing method according to claim 1, wherein if an already focused field of view falling within a pre-given fine focus distance of the imaged field of view is at hand then the method includes setting the focus acquisition means such that one of the image planes incident on one of the plurality of image-capturing surfaces of the at least one secondary camera be identical with the image plane of the best focused image of said already focused field of view, this being performed prior to step b).

3. The focusing method according to claim 2, wherein said pre-given fine focus distance is measured in neighbouring fields of view.

4. The focusing method according to claim 3, wherein no focusing is performed on an imaged field of view if an already focused field of view falling within a pre-given minimal distance of the imaged field of view is at hand.

5. The focusing method according to claim 4, wherein said pre-given minimal distance is measured in neighbouring fields of view, and is smaller then said pre-given fine focus distance.

6. The focusing method according to claim 1, wherein a rough focusing is applied prior to step b) if no already focused field of view falling within a pre-given fine focus distance of the imaged field of view is at hand, said rough focusing comprising the steps of:

i) successively changing the image plane incident on an imaging element chosen from a group consisting of said image-capturing surfaces of at least one secondary camera and said camera via the focus acquisition means;

ii) capturing an image of each image plane incident on said imaging element;

iii) calculating a best focused image from the captured images and determining the image plane corresponding to the best focused image;

iv) selecting one of the plurality of image-capturing surfaces of at least one secondary camera and changing the image plane incident on the selected image-capturing surface via the focus acquisition means such that the image plane incident on said selected image-capturing surface is identical with the image plane of the best focused image.

7. The focusing method according to claim 1, wherein the first optical path and the secondary optical paths are formed such that the image plane incident on one of the plurality of image-capturing surfaces is identical with the first image plane incident on the camera and the image planes incident on the other image-capturing surfaces are identical with neighbouring image planes of the first image plane, said neighbouring image planes corresponding to successive discrete steps of the focus acquisition means.

8. The focusing method according to claim 1, wherein calculation of best focused image includes calculating the definition of the captured images.

9. The focusing method according to claim 1, wherein the second image intensities are essentially equal to each other.

10. The focusing method according to claim 1, wherein the first image intensity is significantly higher than any of the second image intensities.

11. An apparatus for the scanning of a specimen on a microscope slide (4) comprising:

a microscope having microscope optics with an objective and focus acquisition means for modifying the distance of the slide (4) from the objective;

a high-resolution camera (1) for capturing a high-resolution image of a first image plane, the camera (1) being arranged along a first optical path connecting the camera (1) with an imaged portion of the slide and passing through said microscope optics;

a beam splitting means (3) arranged in the first optical path for letting a first portion of a light beam coming from the microscope optics pass through to the camera (1) and directing a second portion of the light beam to a second optical path;

a plurality of filters (8) arranged such as to further divide said second optical path into a plurality of secondary optical paths having different optical lengths;

a plurality of image-capturing surfaces of at least one secondary camera (2) positioned along said plurality of secondary optical paths for the formation of a plurality of optical images of a plurality of image planes, said plurality of image-capturing surfaces being formed as distinct portions of a single camera;

means for selecting a best focused image from said plurality of images captured of the plurality of image planes; and means for changing the first optical path via said focus acquisition means such that the resulting first image plane is identical with the image plane of the best focused image.

12. The apparatus according to claim 11, wherein the focus acquisition means is a slide displacing device for displacing the slide (4) parallel to an optical axis of the microscope optics.

13. The apparatus according to claim 12, wherein the slide displacing device comprises slide holding means defining a slide support plane and first displacing means for displacing said slide holding means, the slide holding means being affixed to one side of a supporting means having two parallel sides, which parallel sides are connected by stiffening elements defining at least two parallel planes and the stiffening elements are adjoined to said sides via resilient elements, preferably flat springs (29).

14. The apparatus according to claim 13, wherein one of the stiffening elements is a stiffening plate (24) adjoined to the ends of both sides of said supporting means via flat springs (29).

15. The apparatus according to claim 13, wherein a column (25, 26) is attached to both of said sides of said supporting means and the stiffening element defining one of the two parallel surfaces is adjoined to the ends (27, 28) of said columns (25, 26) by means of flat springs (29).

16. The apparatus according to claim 15, wherein a pretensioning spring (32) is provided between the end (28) of one of said columns (26) and a foot (31) of said other column (27).

17. The apparatus according to claim 13, wherein said slide holding means comprises a slide holding frame (10) having on one of its sides fixing means, particularly lugs or loops (33), for fixing a slide (4) in said frame (10).

18. The apparatus according to claim 13, wherein said first displacing means comprises an arm (34) capable of tilting relative to a support (38).

19. The apparatus according to claim 18, wherein one end of said arm (34) is supported by an eccenter disk (36) and the other end is in connection with said slide holding means or a slide (4) held by said slide holding means.

20. The apparatus according to claim 11, wherein said beam splitting means is a filter with a transmittance of at least 50% in the direction of the camera (1).

21. The apparatus according to claim 11, wherein the plurality of secondary optical paths are created by a plurality of filters (8) and optionally by reflecting surfaces.

22. The apparatus according to claim 21, wherein said plurality of filters (8) are arranged in a row and have such transmittances that the light intensity of the light beams incident on the plurality of image-capturing surfaces of the at least one secondary camera is substantially the same.

23. The apparatus according to claim 22, wherein said plurality of filters consist of three filters arranged in a row, transmittances of said three filters being about 66%, about 50% and about 0%.

24. The apparatus according to claim 11, wherein the first optical path and the secondary optical paths are formed such that the image plane incident on one of the plurality of image-capturing surfaces is identical with the first image plane and the image planes incident on the other image-capturing surfaces are identical with neighbouring image planes of the first image plane, said neighbouring image planes corresponding to successive discrete steps of the focus acquisition means.

25. The apparatus according to claim 11, further comprising an optical rangefinder, said optical rangefinder comprising a light source (47), a light sensor and a beam splitter arranged on the opposite side of the objective (5) as the sample (41) and angled relative to the optical axis of the objective (5), said beam splitter directs light beam coming from said light source (47) onto said objective (5) and at least a part of the light beam coming from said objective onto said light sensor, said light source (47) emits light within a second wavelength interval distinct from a first wavelength interval used for the microscopic analyses, and the beam splitter is a filter (45), which is substantially transparent in the first wavelength interval.

26. The apparatus according to claim 25, wherein said light source is an infrared laser source (47).

27. The apparatus according to claim 25, wherein said light sensor is a camera (48) in connection with a calculating unit for calculating the distance between said sample (41) and said objective (5) using the information relating to the position of the light incident on the camera (48).

28. The apparatus according to claim 27, wherein said camera (48) is an optical row sensor or a 2-dimensional camera.

29. The apparatus according to claim 25, further comprising optical elements provided between the light source (47), the light sensor, and the filter (45).

30. The apparatus according to claim 29, wherein the optical elements are one or more prism.

* * * * *